Figure 1:
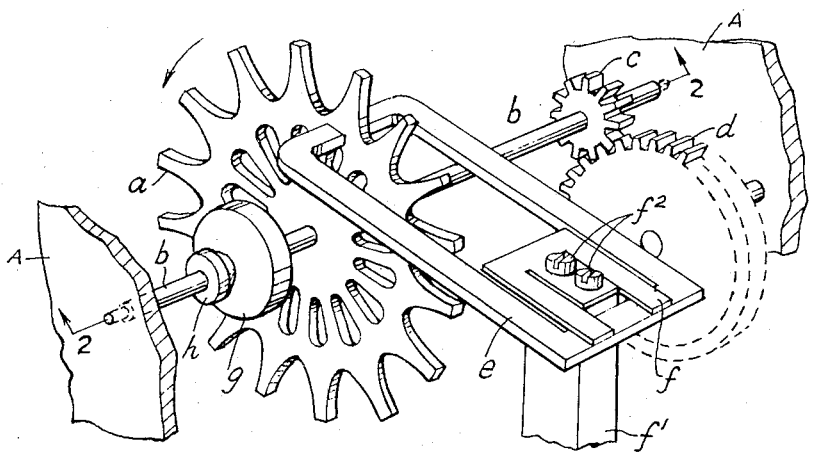

Nov. 24, 1959        C. F. CLIFFORD        2,913,905
MAGNETICALLY COUPLED OSCILLATORY AND ROTARY MOTIONS
Filed Nov. 3, 1954

INVENTOR
Cecil F. Clifford
BY Rockwell & Bartholomew
ATTORNEYS

United States Patent Office 2,913,905
Patented Nov. 24, 1959

2,913,905
MAGNETICALLY COUPLED OSCILLATORY AND ROTARY MOTIONS

Cecil Frank Clifford, Bath, England, assignor to Horstmann Clifford Magnetics Limited, Bath, England, a corporation of Great Britain Application November 3, 1954, Serial No. 466,638

Claims priority, application Great Britain November 7, 1953

3 Claims. (Cl. 74—1.5)

This invention relates to magnetically coupled oscillatory and rotary systems and is particularly, though not exclusively, applicable to escapement mechanism for time-pieces of the kind comprising a wavy track and pole pieces so associated that, while the poles are magnetically coupled to the wavy track and follow the same by reason of a combination of oscillatory and rotary motions, such motions are relatively separated so that there is an oscillatory system having a natural frequency of oscillation and a rotary system separate from such oscillatory system except for being magnetically coupled thereto, the speed of rotation of which rotary system is controlled by the frequency of oscillation of such oscillatory system.

The present invention is based upon the appreciation for the first time that the "elastic" character of the said magnetic coupling is capable of supporting on the rotating movement a superimposed oscillatory movement which, while it may not prejudice the basic or controlling frequency of oscillation of the oscillatory system, stresses the magnetic coupling and, if the natural frequency of such superimposed oscillatory movement synchronises with, or is a harmonic or sub-multiple of, impulses in the mechanism, for example from any teeth in a preceding gear train, such superimposed oscillatory movement may build up in amplitude so as unduly to stress, or even break, the magnetic coupling or cause fouling of any mechanism (such as a stop pin) provided to prevent breakage of the magnetic coupling and resultant "escape" or run-away of the rotary system. The "elastic" character of the magnetic coupling comes into effect most of the time of operation of the mechanism because obviously such magnetic coupling has to perform the function of controlling the rotation of the rotary system and such control, by the nature of things entails some degree, however small of acceleration and deceleration of rotation. Thus the rotary system itself becomes an oscillator having a natural frequency of vibration which is a function of the restoring force obtained from the magnetic coupling and which is by no means isochronous as such force has a "square" factor by known laws of magnetism. Whilst such natural frequency may not be an exact fraction of the basic or controlling frequency of the oscillatory system and will therefore not build up therefrom, it will be present and, if it should be a harmonic or exact fraction of some impulses within the mechanism, as for example from the teeth of a preceding gear train of a timepiece, it may build up from such impulses sufficiently to prejudice the magnetic coupling. Consequently it is desirable to damp out of the rotary system any oscillation whether directly imposed through the magnetic coupling and of the order of the fundamental frequency of the oscillatory system or whether developed within the rotary system by reason of its capacity to operate as an oscillator as above explained.

It has also been established by research that frequencies developed within the rotary system which are a proper unitary fraction of the fundamental frequency of the oscillator, have to be taken into consideration. That is to say, whilst the fundamental frequency of the rotary system is determined by the restoring force from the magnetic lock and the moment of inertia of the rotary system considered as an oscillator, fractional frequencies of $\frac{1}{2}$, $\frac{1}{3}$, $\frac{1}{4}$, $\frac{1}{5}$, $\frac{1}{6}$, $\frac{1}{7}$, $\frac{1}{8}$, $\frac{1}{9}$ and $\frac{1}{10}$ and even as low as $\frac{1}{20}$ (i.e. 5 cycles per second if the fundamental frequency is 100 c.p.s.) are generated and these fractional frequencies as well as the fundamental frequency of the rotary system have to be effectively damped out of the rotary system if the optimum effect is to be obtained.

It must further be appreciated that with a magnetically coupled escapement as in a timepiece the escape wheel or rotor is driven and therefore at all times has a tendency to accelerate and move in advance of the controlling oscillator. This imposes an initial stress on the magnetic coupling. It is also obvious that the rotor cannot be so designed that it will have at all times and with varying amplitude for the oscillator a perfectly uniform speed of rotation as is implicit by the rotational control which the oscillator has to provide and because the rotor also has to perform the function of impulsing the oscillator to maintain the oscillations thereof. As some acceleration and deceleration of the rotor is therefore unavoidable and as this has to be effected by the oscillator through the elastic medium of the magnetic coupling, conditions are always present as aforesaid to generate oscillations between the rotor and oscillator with the magnetic coupling as the restoring force, and any such oscillations impose additional stress on the magnetic coupling. Such stresses together determine the tolerances of the escapement and materially affect factors of stability for the magnetic coupling, self-starting, driving torque range etc. For example, while the combination of a relatively high driving torque and low moment of inertia for the rotor is required for good self-starting properties, those conditions necessarily impose maximum stress on the magnetic coupling. Without a stabiliser as provided by the present invention the rotor under high torques tended to accelerate so quickly that the magnet oscillator had not time to build up its oscillations. The magnetic coupling was thereby broken or so stretched that the escape wheel teeth fouled the guard pin provided to prevent "run-away" of the rotor. With a rotor having a higher moment of inertia, as by fixing the stabiliser disc thereto the rotational build up is slow but the increased inertia gives the rotor a natural low frequency which seems to build up oscillations of the rotor more easily than with the light rotor and higher natural frequency of rotational oscillation. With a heavier rotor also, if the guard pin is fouled it may be permanently bent. With a frictionally mounted stabiliser disc according to the present invention the guard pin is not bent if fouled. The stabiliser provided by this invention not only reduces or eliminates unwanted oscillation frequencies which strain the magnetic coupling but also reduces the over-run strain which is probably greatest when starting, as any under-amplitude oscillation of the oscillator has the effect of flattening-out the controlling wavy track and of giving the rotor a greater freedom to accelerate at the peak of the wavy track than it has when the oscillator is vibrating normally.

The objects of the present invention are to improve the stability of the magnetic coupling, to enable better self-starting without rupture of such coupling, to widen the range of driving torque which can be used so that for example for a spring-driven mechanism it can be designed for a longer running time and with wider manufacturing tolerances as regards such factors as spring strength or magnet strength, air gap at the magnetic coupling, etc. The fact is, of course, that, due to the unique use of a magnetic coupling in an escapement mechanism there are new and unique problems inter alia as above explained and the present invention meets some or all of these problems so as to provide a greatly improved escapement mechanism of such kind.

According to the invention, mechanism embodying magnetically coupled oscillatory and rotary systems is characterised by the provision of oscillation-damping means for the rotary system.

According to a further feature of the invention the oscillation-damping means is so proportioned and constructed as to be capable of damping out frequencies not only of the order of the fundamental frequency of the oscillatory system but lower including several which are proper unitary fractions of the said fundamental or basic frequency.

Figure 2:
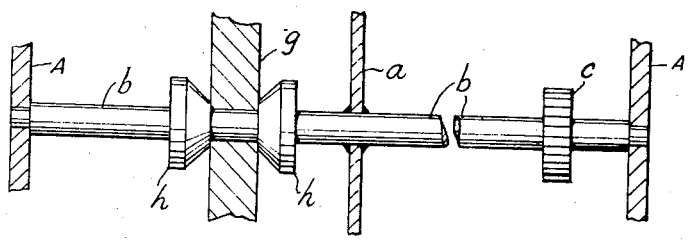
Figure 3:
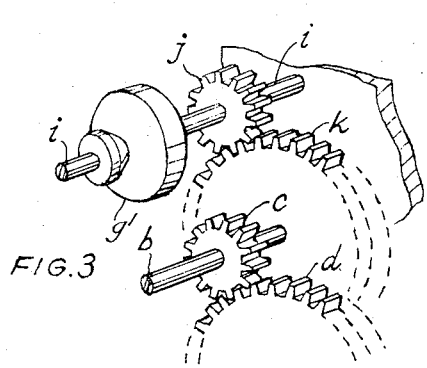

The accompanying drawings illustrates diagrammatically one example of the invention applied to the escapement of a timepiece, in which:

Figure 1 is a perspective view, and
Figure 2 is a fragmentary section on line 2—2 of Figure 1;
Figure 3 shows a modification.

In the example shown, the escapement mechanism comprises a rotor $a$ in the form of a metal stamping of magnetic metal of high resistivity and high permeability, of spoked and toothed form mounted on a spindle $b$ having a preceding spring driven gear train, only the final gear wheels $c$, $d$ of which are shown. The aforesaid parts are mounted in the usual manner between plates A, A of a framework. The speed of rotation of the rotor is controlled by a permanent magnet $e$ mounted on a spring $f$ so as to form the main part of an oscillatory system, the spring $f$ being secured to a pillar $f'$ by screws $f^2$.

In the example shown, the oscillatory system has a natural frequency of 100 cycles per second. Owing to the elasticity of the magnetic coupling, if the magnet is held stationary the rotor $a$ while still loaded by the preceding gear train, itself forms an oscillatory assembly having a natural frequency of the order of 10 cycles per second, the restoring force, necessary to support oscillation, being provided by the magnet coupling. Such oscillations, unless damped, together with harmonics thereof especially if they are unitary fractions of the basic frequency of the oscillator, can build up to the prejudice of the magnetic coupling.

In order to damp any oscillation of the rotor $a$ including any basic frequency transmitted to it by the oscillator a small damper disc $g$ is loosely mounted on the spindle $b$ of the rotor $a$ so as to permit its free rotation. Such disc is located on the spindle by means of collets $h$ fixed to the spindle and so shaped that the friction between the damper disc $g$ and spindle $b$ or collets $h$ is substantially the same for all directions of orientation of the rotor spindle $b$ between vertical and horizontal. Suitable clearances, not shown, are provided between the damper disc and the collets and between the damper disc and the spindle to permit the disc to turn on the spindle.

It will be appreciated that the moment of inertia $$\left(\frac{\text{weight}}{g} \times \frac{\text{radius}^2}{2}\right)$$

of the damper disc $g$ should be of the same order as that of escape wheel or rotor $a$ to achieve a reasonable reluctance to oscillate with the spindle shaft $b$. The frictional torque linking the spindle $b$ with the damper disc $g$ (weight×coefficient of friction×rubbing radius) must be high enough to provide frictional damping yet not so high as to give a positive link to the damper disc $g$ under oscillatory conditions. In some cases, to damp low frequencies it has been necessary to use polytetrafluorethylene bushes for the damping discs to reduce the coefficient of friction.

On an alarm clock with a fully wound input of 35 gm. cms. a minute with an escape wheel 15 mm. diameter and ¼ mm. thick it was found that a damper or stabiliser disc $g$ 8 mm. diameter could have thicknesses between ¼ mm. and 2 mm. thick when made of brass running on a spindle .75 mm. diameter. The actual thickness fitted in a successful experiment was .75 mm. in order to have a fair margin in each direction.

As previously stated the function of the damping mechanism is to damp out from the rotary system any frequencies of rotational oscillation including particularly oscillation of the order of the fundamental or basic frequency of the oscillatory system and any proper unitary fractions thereof down to ½₀ or even ¼₀, because of the tendency with such frequencies of a build up.

On the lower frequencies the accelerating forces (inducing the rotor to oscillate as well as rotate) are smaller and unless the friction between stabiliser disc and the rotor shaft is very small, these forces can be transmitted to the disc through the friction. Early trials were unsuccessful because this fact had not been appreciated. It has now been established that in the arrangement shown and above described, no stabiliser is successful unless the bearing is less than about .040″ (1.016 mm.) diameter.

A better way of expressing this fact is that for a solid disc stabiliser where the coefficient of friction between stabiliser and shaft is of the order of 0.2, it is found that the bearing diameter must be less than one eighth the outside diameter of the solid disc to damp the low frequencies.

The thickness of the solid disc appears to bear no relation to the frequencies or range of frequencies which can be damped, it only decides in how many cycles a given amplitude can be damped out.

By using polytetrafluorethylene (PTFE), whose frictional coefficient to steel is of the order .05, the ratio between outside diameter of stabiliser disc to bearing diameter could, theoretically, be reduced to 2:1; but this has not been found to hold in practice. Nevertheless, one can use lower ratios than the 8:1 mentioned above. It has been necessary to use 4:1 ratios in some applications and PTFE bushes were then essential to damp the low frequency parasitic oscillations of the rotor.

The following is a description of the present invention applied to practical conditions which may be met in the construction of a timepiece:

Let
$A$=Fundamental frequency in cycles per second of the oscillator;
$B$=Fundamental frequency of oscillation of the rotor where $$B = \sqrt{\frac{C}{I}}$$

and C is magnetic control force of magnet on the rotor and I is its moment of inertia about its oscillatory axis which is also its axis of rotation;
$R$=Revs per second of the rotor;
$N$=Number of teeth (wave cycle) of rotor.
If $A$=100 c.p.s. and $N$=20, which are quite normal and practical figures for magnetically coupled systems of the kind referred to, then $$R = \frac{A}{N} = \frac{100}{20} = 5 \text{ r.p.s.}$$

If the rotor is out of balance and running in a vertical plane, the driving torque will be augmented by an out of balance torque 5 times per sec. tending to cause the rotor to oscillate (with respect to the magnet poles) as well as rotating. If B equals 5 c.p.s. and no stabiliser were provided, then this oscillation, being equal to the r.p.s. aforesaid, would build up, causing fouling of the guard pin, and faulty running and time-keeping.

Similarly, if every alternate tooth of the rotor was imperfectly pitched there would be ten parasitic pulses per rev (50 per second) tending to make the rotor oscillate at 50 c.p.s. while rotating at 5 r.p.m.

On a 20 tooth (wave) rotor there could not be imperfections every third tooth but there could be at every fourth tooth (giving rise to 25 c.p.s. vibration), at every fifth tooth (giving rise to 20 c.p.s. vibration) and at every tenth tooth (giving rise to 10 c.p.s. vibration).

For safety then it has been found necessary to provide the rotor with a damper of vibrations which will damp all frequencies from $$A \text{ to } \frac{A}{20}$$

at least and preferably as low as $$\frac{A}{40}$$

The higher frequencies are easily damped as they are associated with higher accelerating and decelerating forces and even a relatively badly designed damper will take care of frequencies of 25 c.p.s. and above. The ratio of damper inertia to damper friction is not however so easily found, and provided, for frequencies as low as 2½ c.p.s.

In use, it was found that the damping mechanism made as above described which damps by frictional dissipation of energy any undue acceleration or deceleration of rotation of the spindle and which therefore damps any oscillations superimposed on such rotation, improved the steady running of the rotor as viewed under a stroboscope and hence improves the resistance to rupture of the magnetic coupling. Such clocks also run longer on one winding of the mainspring. In the case of a pendulum clock escapement it improves the torque handling capacity, that is to say the range of escape wheel torque which could be applied to the escape wheel without rupture of the magnetic coupling. This is believed to be due to the damping out of any oscillation of the rotor particularly at the end of each escape movement when there is the maximum tendency for the incidence of any such oscillation.

In the modification shown in Figure 3, instead of mounting the damper disc on the spindle of the rotor, a further spindle $i$ is mounted in the frame coupled by wheels $j$ and $k$ to the spindle $b$ so as to rotate at a higher speed. A damper disc $g'$ of the same construction as the disc $g$ is mounted on the spindle $i$. Oscillations of the rotor spindle $b$ are amplified and transmitted to the auxiliary spindle $j$ so that the damper disc thereon may damp out the unwanted oscillations of the rotor. The pinion gearing coupling the two spindles may be replaced by another type of coupling if desired, to eliminate back-lash tolerance present in all toothed gearing.

As a further modification, the rotatable member, instead of being mounted on the spindle of the rotor or of another spindle geared thereto, may be mounted direct on the rotor itself, for example, on a small hub-like extension of the rotor, or as a further alternative by mounting on a small laterally extending hub of the pinion on the rotor spindle.

I claim:

1. A damper for a mechanism embodying magnetically coupled oscillatory and rotary systems comprising an oscillatory magnet and spring mounting means therefor providing a natural frequency of oscillation of the order of 100 cycles per second, a rotatable spindle, a rotor mounted on said spindle having a wavy magnetic track complementary to the magnet poles with 20 wave cycles so as to provide a magnetic coupling controlling complementary rotation at 5 revolutions per second, gearing means for driving said rotor, said damper including a disklike member supported in friction bearing engagement on the spindle for damping rotational oscillations of the rotary system, said disklike member having an opening therein snugly but rotatably receiving the spindle, the outside diameter of the disklike member being at least four times the effective bearing diameter of the damper on the spindle, and said friction bearing engagement including collets fixed to the spindle, one on each side of the disklike member, and each providing an end bearing surface for rubbing friction against said disklike member of the same order as that of the peripheral bearing on the spindle whereby the rubbing friction is substantially equalized in various orientations of the rotary system.

2. A damper for a mechanism embodying magnetically coupled oscillatory and rotary systems comprising an oscillatory magnet forming part of the oscillatory system, resilient mounting means for the magnet giving thereto a natural frequency of oscillation, a rotatable spindle, a rotor forming part of the rotary system mounted on said spindle, said rotor having a wavy track complementary to the poles of the magnet for providing a magnetic coupling between the rotor and the magnet to control the speed of rotation of the rotor, gearing means for driving the rotor, said damper including means for damping harmonic rotational oscillations of the rotary system comprising a disklike member having an opening therein snugly receiving the spindle of the rotor to frictionally and rotatably mount said member thereon with its center of gravity substantially on the axis of the spindle, a collet secured upon the spindle upon each side of the rotary member and the end surfaces of said collets frictionally engaging the disklike member to produce substantially equal rubbing friction in various orientations of the rotary system.

3. A damper for a mechanism embodying magnetically coupled oscillatory and rotary systems comprising an oscillatory magnet forming part of the oscillatory system, spring-mounting means for the magnet giving it a natural frequency of oscillation, a rotatable spindle, a rotor forming part of the rotary system mounted on said spindle, said rotor having a wavy track complementary to the poles of the magnet and providing a magnetic coupling between the rotor and the magnet to control the speed of rotation of the rotor, gearing means for driving said rotor, said damper including a disklike member supported in friction bearing engagement on the spindle for damping rotational oscillations of the rotary system, said friction bearing engagement including abutment members on said spindle, one on each side of the disklike member and each providing an end bearing surface for rubbing friction against said disklike member of the same order as that of the peripheral bearing on the spindle whereby the rubbing friction is substantially equalized in various orientations of the rotary system.

References Cited in the file of this patent

UNITED STATES PATENTS

| | | |
|---|---|---|
| 1,631,982 | Potts | June 14, 1927 |
| 1,796,649 | Hammond | Mar. 17, 1931 |
| 1,944,011 | Larsh et al. | Jan. 16, 1934 |
| 2,100,751 | Runge | Nov. 30, 1937 |
| 2,313,984 | Breckenridge et al. | Mar. 16, 1943 |
| 2,338,470 | Urguhart et al. | Jan. 4, 1944 |
| 2,347,059 | Mulheim | Apr. 18, 1944 |
| 2,386,402 | Lilja | Oct. 9, 1945 |
| 2,571,085 | Clifford | Oct. 9, 1951 |
| 2,743,614 | Clifford | May 1, 1956 |
| 2,762,222 | Clifford | Sept. 11, 1956 |

FOREIGN PATENTS

| | | |
|---|---|---|
| 442,439 | Germany | Mar. 30, 1927 |